United States Patent Office 3,321,496
Patented May 23, 1967

3,321,496
16α-HALO METHYL-SATURATED STEROIDS OF THE PREGNANE SERIES
David Taub, Metuchen, and Norman L. Wendler, Summit, N.J., assignors to Merck & Co., Inc., Rahway, N.J., a corporation of New Jersey
No Drawing. Filed Nov. 17, 1960, Ser. No. 69,794
6 Claims. (Cl. 260—397.45)

This invention relates to novel steroid compounds. More specifically, this invention relates to 16α-and β halogeno-alkyl-17α-hydroxy pregnene and pregnadienediones and triones of the formula:

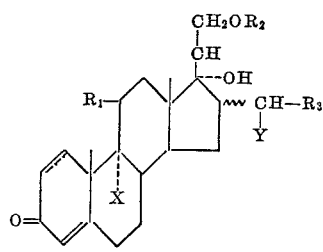

in which $R_1$ may be keto or β-hydroxyl, $R_2$ may be hydrogen or lower alkanoyl, $R_3$ may be hydrogen or alkyl, X may be hydrogen or halogen, Y is a halogen and the dotted line between carbons No. 1 and No. 2 shows that the bond may be either a single or a double bond.

The 16 halogeno-alkyl steroids produced in accordance with the present invention possess extremely high anti-inflammatory activity, considerably greater than that of the parent steroids, and are especially effective for the treatment of arthritis and related diseases since they can be administered for their cortisone-like action in low dosage thereby minimizing undesired side effects.

Of the compounds of our invention, those having a 1,4-diene structure are prepared as described in the schematic Flow Sheet I. Among the materials which may be used as a starting material in the process described in Flow Sheet I are 16α-methyl-1,4-pregnadiene-17α,21-diol-3,11,20-trione,
16β-methyl-1,4-pregnadiene-17α-21-diol-3,11,20-trione,
16α-ethyl-1,4-pregnadiene-17α,21-diol-3,11,20-trione,
16β-ethyl-1,4-pregnadiene-17α,21-diol-3,11,20-trione,
16α-propyl-1,4-pregnadiene-17α,21-diol-3,11,20-trione,
16β-propyl-1,4-pregnadiene-17α,21-diol-3,11,20-trione,
16α-methyl-1,4-pregnadiene-11β,17α,21-triol-3,20-dione,
16β-methyl-1,4-pregnadiene-11β,17α,21-triol-3,20-dione,
16α-ethyl-1,4-pregnadiene-11β,17α,21-triol-3,20-dione,
16β-ethyl-1,4-pregnadiene-11β,17α,21-triol-3,20-dione,
16α-butyl-1,4-pregnadiene-11β,17α,21-triol-3,20-dione,
16β-butyl-1,4-pregnadiene-11β,17α,21-triol-3,20-dione,
9-halo-16-alkyl-1,4-pregnadiene-17α,21-diol-3,11-20-trione,
9α-fluoro-16α-butyl-1,4-pregnadiene-16α,21-diol-3,11,20-trione,
9α-fluoro-16α-methyl-1,4-pregnadiene-17α,21-diol-3,11,20-trione,
9α-fluoro-16β-methyl-1,4-pregnadiene-17α,21-diol-3,11,20-trione,
9α-chloro-16α-methyl-1,4-pregnadiene-17α,21-diol-3,11,20-trione,
9α-chloro-16β-methyl-1,4-pregnadiene-17α,21-diol-3,11,20-trione,
9α-fluoro-16α-ethyl,1,4-pregnadiene-17α,21-diol-3,11,20-trione,
9α-fluoro-16β-ethyl-1,4-pregnadiene-17α,21-diol-3,11,20-trione,
9α-fluoro-16α-propyl-1,4-pregnadiene-17α,21-diol-3,11,20-trione,
9α-fluoro-16β-propyl-1,4-pregnadiene-17α,21-diol-3,11,20-trione,
9-halo-16-alkyl-1,4-pregnadiene-11β,17α-21-triol-3,20-dione,
9α-fluoro-16β-butyl-1,4-pregnadiene-17α,21-diol-3,11,20-trione,
9α-fluoro-16α-methyl-1,4-pregnadiene-11β,17α,21-triol-3,20-dione,
9α-fluoro-16β-methyl-1,4-pregnadiene-11β,17α,21-triol-3,20-dione,
9α-chloro-16α-methyl-1,4-pregnadiene-11β,17α-21-triol-3,20-dione,
9α-chloro-16β-methyl-1,4-pregnadiene-11β,17α,21-triol-3,20-dione,
9α-fluoro-16α-ethyl-1,4-pregnadiene-11β,17α,21-triol-3,20-dione,
9α-fluoro-16β-ethyl-1,4-pregnadiene-11β,17α,21-triol-3,20-dione,
9α-fluoro-16α-butyl-1,4-pregnadiene-11β,17α,21-triol-3,20-dione,
9α-fluoro-16β-butyl-1,4-pregnadiene-11β,17α,21-triol-3,20-dione, and the like.

Those compounds of our invention having only one double bond in the Ring A, in the $\Delta^4$ position, are prepared by partial hydrogenation of the corresponding $\Delta^{1,4}$ compounds as shown in Flow Sheet I or from Ring A saturated intermediates as described in the schematic Flow Sheet II. These 16-haloalkyl substituted saturated intermediates are themselves new and form a separate aspect of our invention. Among the starting materials which may be used in the process of Flow Sheet II may be mentioned 3α-acetoxy-16-pregnene-11,20-dione, 3α-acetoxy-16-allopregnene-11,20-dione and the like.

FLOW SHEET I

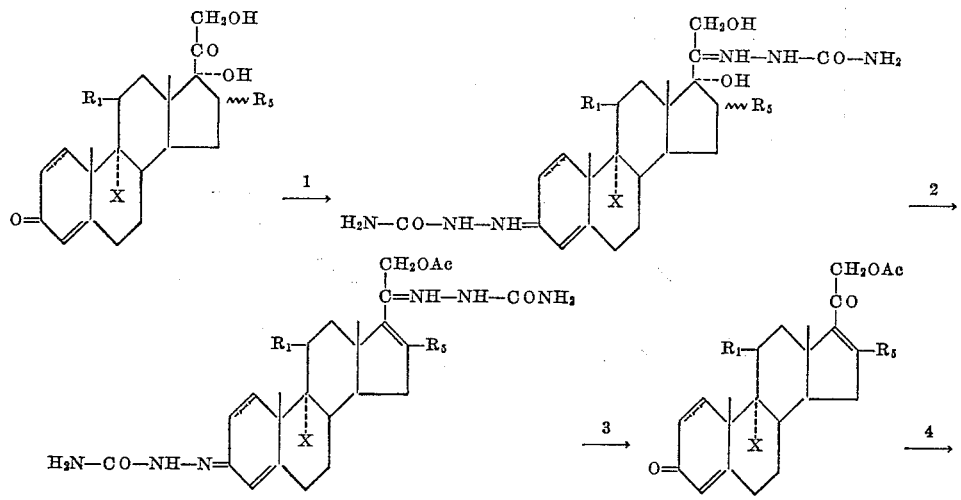

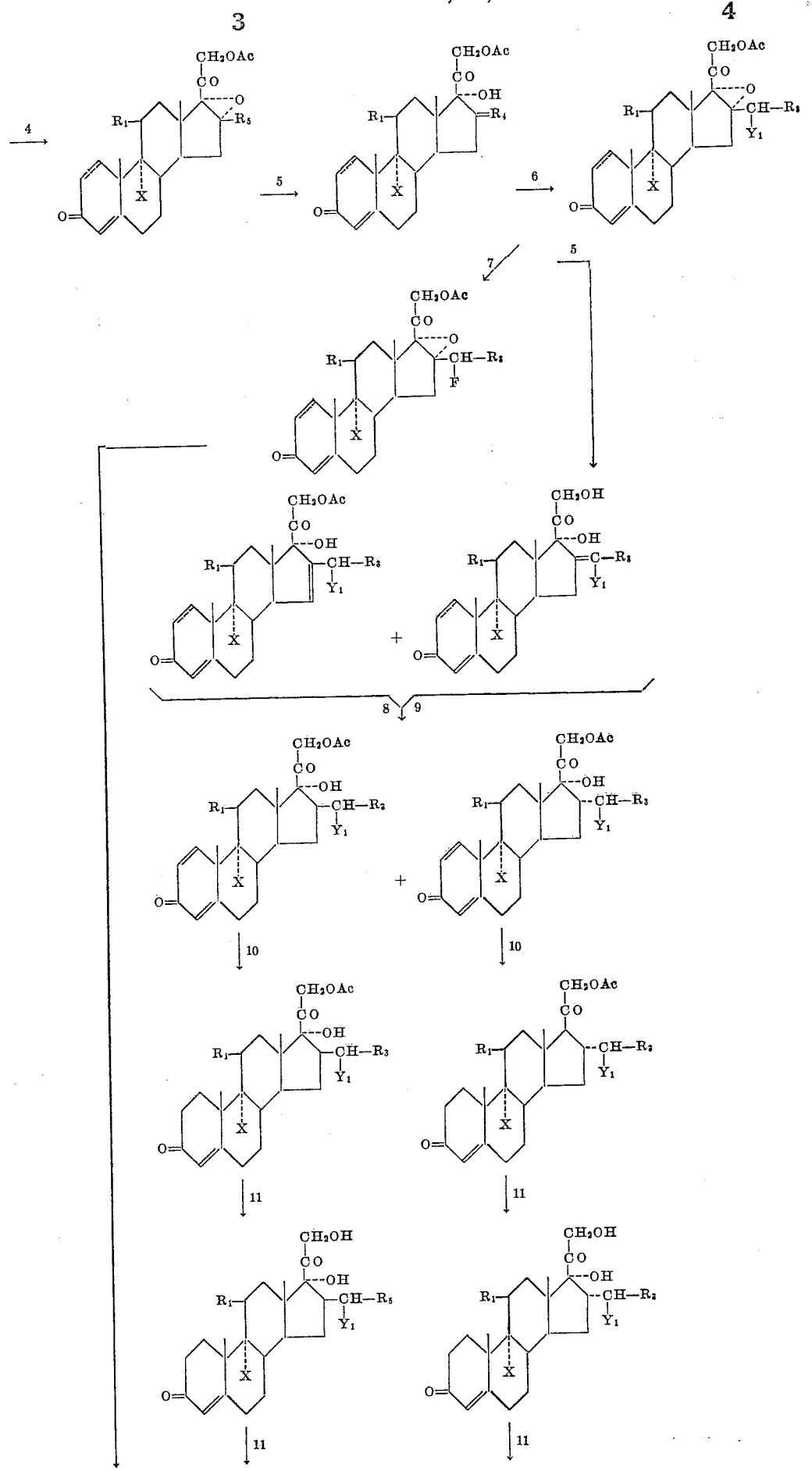

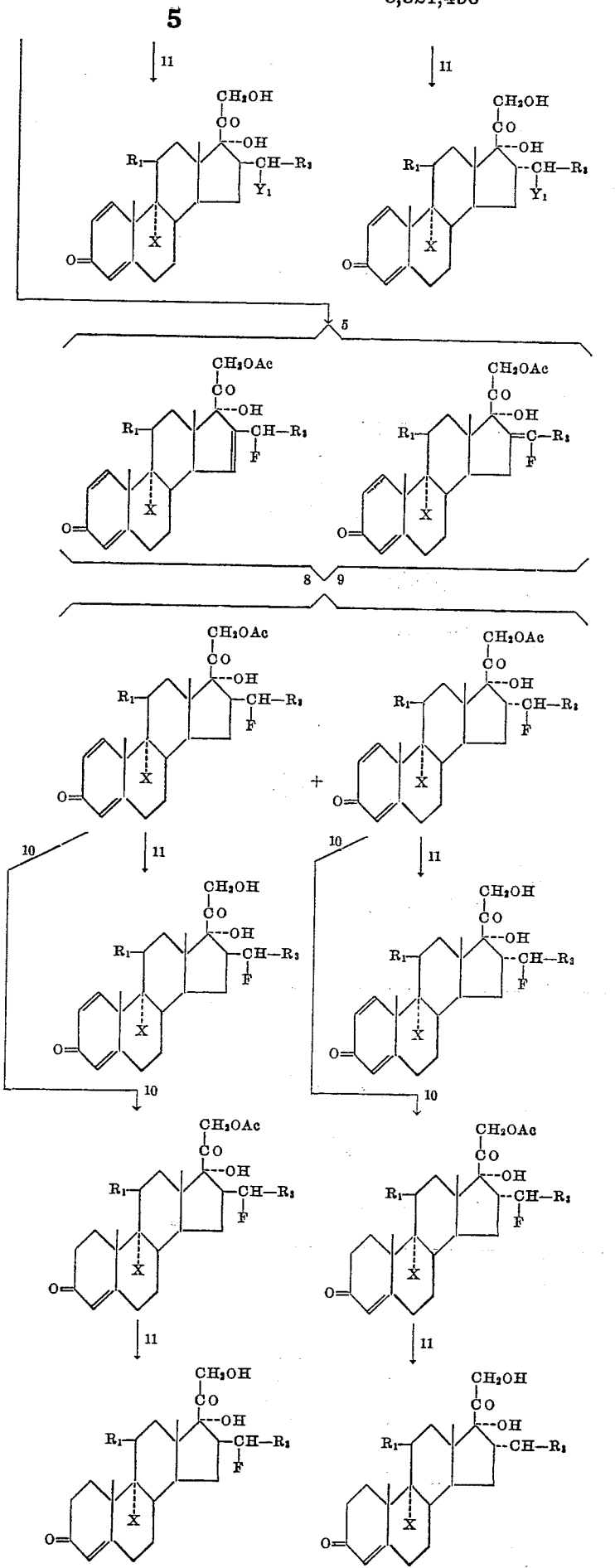

Definitions:
 R$_1$ = hydroxy or keto
 R$_5$ = alkyl
 R$_4$ = alkylidene of same number of carbons as R$_3$
 R$_3$ = alkyl one carbon less than R$_3$ or H if R$_3$ is methyl
 X = hydrogen or halogen
 Y$_1$ = Br or Cl
 Ac = acetyl (other lower alkanoyl groups could also be used)
Reactants:
 1 = semicarbazide base plus hydrochloride
 2 = acetic acid plus acetic anhydride
 3 = hot aqueous acetic acid
 4 = an organic peracid
 5 = strong acid (e.g., HBr, HCl, HF, HClO$_4$, CF$_3$COOH, etc.)
 6 = N-bromosuccinimide or N-chlorosuccinimide
 7 = AgF in acetonitrile
 8 = catalytic hydrogenation
 9 = Reintroduction of Ring A double bonds—SeO$_2$ or bromination and dehydrobromination
 10 = partial hydrogenation
 11 = acid or base hydrolysis

FLOW SHEET II

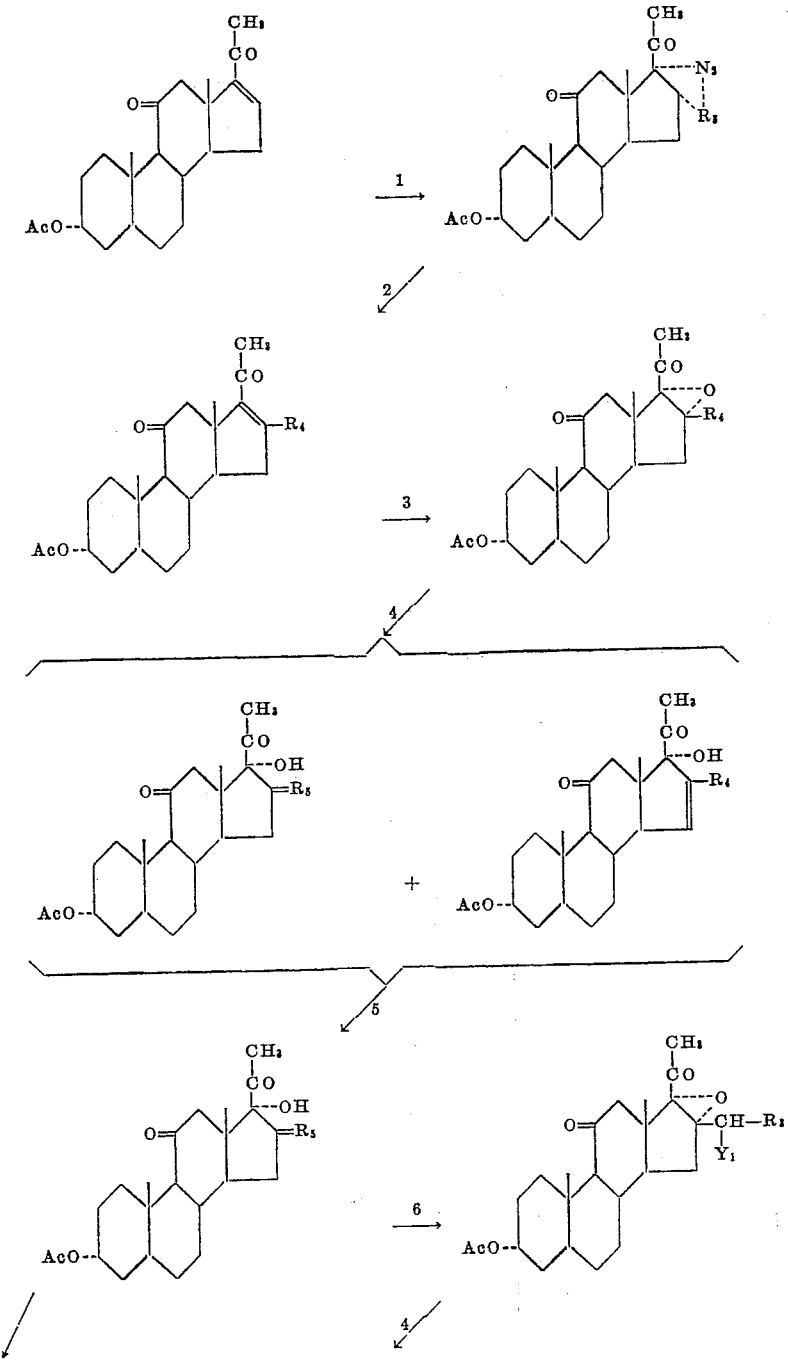

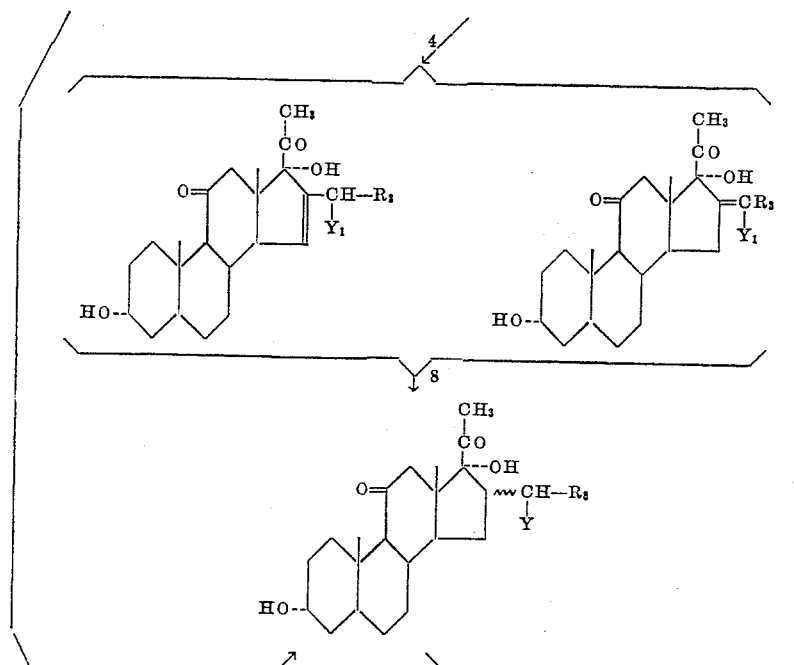
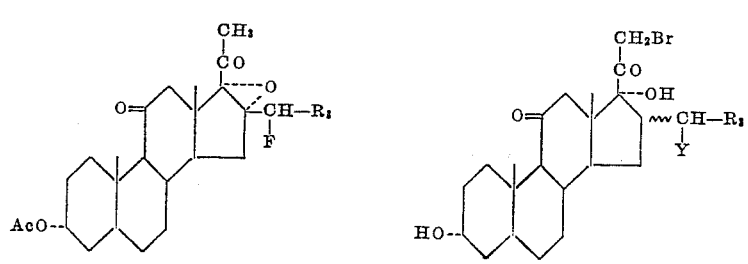
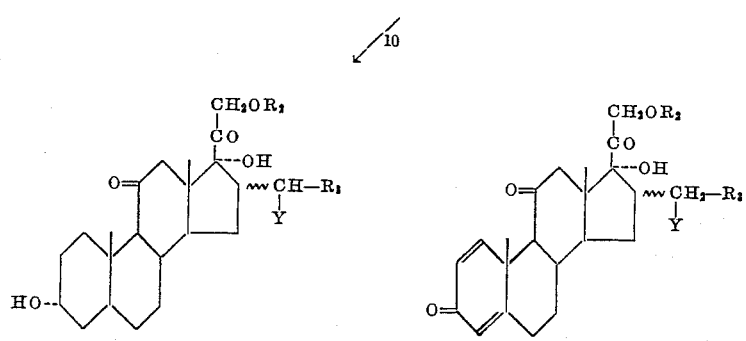
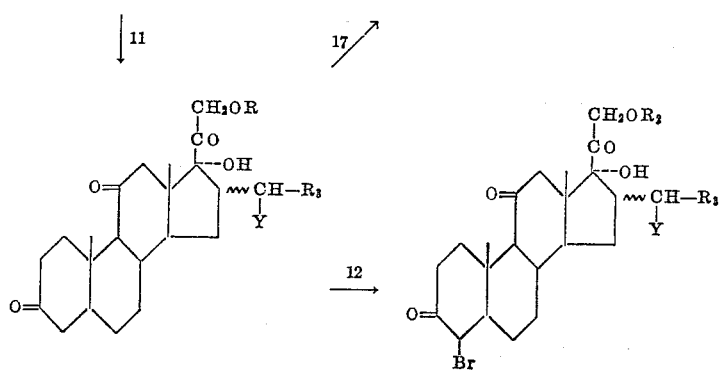

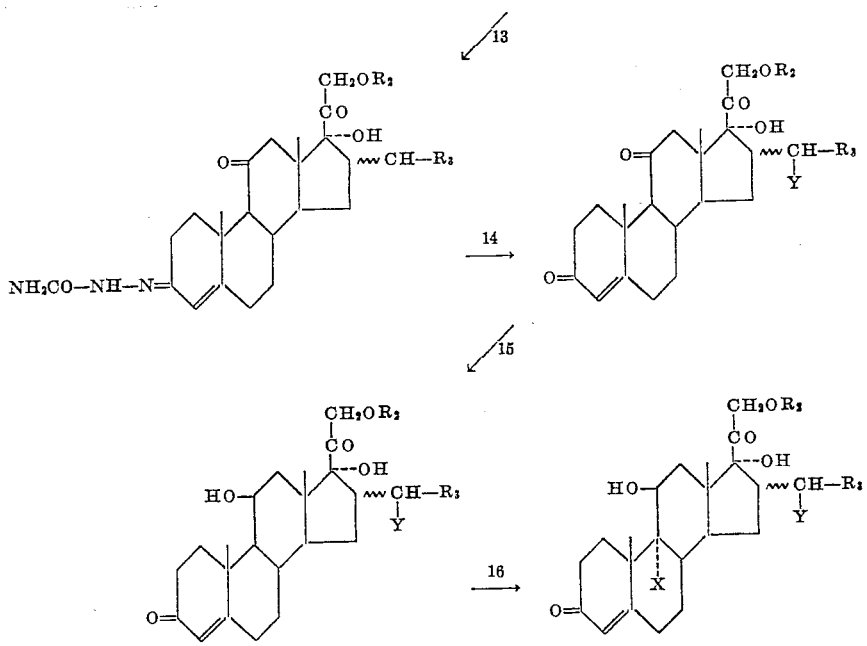

Note: Any of the last three products shown, or that produced by Reaction 17, by acid or base hydrolysis, gives the free C-21 hydroxyl.

Definitions:
- $R_2$ = lower alkanoyl
- $R_5$ = alkylidene
- $R_4$ = α or β alkyl of same number of carbon atoms as $R_3$
- $R_3$ = hydrogen or alkyl of one less carbon than $R_4$
- X = halogen
- Y = halogen
- $Y_1$ = Br or Cl A wavy line linking a

to the 16 position indicates α and/or β linkage. Mixtures can be separated by chromatography.

Reagents:
1. Diazoalkane
2. Heat
3. Peroxide oxidation—alkaline $H_2O_2$, or alkyl hydroperoxide base, followed by reacetylation at $C_3$, or an organic peracid
4. Strong acid (HBr, HCl, HF, $HClO_4$, $CF_3COOH$, etc.)
5. Separation by recrystallization
6. N-bromosuccinimide or N-chlorosuccinimide in 5-butanol
7. AgF in acetonitrile
8. $H_2$ reduction over pH catalyst
9. $Br_2$ in $CHCl_3$
10. $KI + KOR_2 + R_2OH$ in acetone
11. $Na_2Cr_2O_7$
12. $Br_2$
13. Semicarbazide
14. Aqueous acetic and pyruvic acids.
15. Reduction of 11-carbonyl groups via semicarbazide procedure
16. Introduction of 9-α-halogen by standard procedures
17. Selenium dioxide The details of the reactions shown in Flow Sheets I and II are to be found in the examples.

Compounds of our invention having longer halogenoalkyl groups at C16 than halogeno-methyl are obtained by using, in the above-described synthesis, as shown in Flow Sheet II, in place of diazomethane, other diazo alkanes such as diazoethane, diazopropane, diazobutane and the like to form the corresponding pyrazoline compounds which upon heating at about 180° C. are converted to the corresponding 16-alkyl-16-pregnenones. Thus, higher halogeno-alkyl analogs of the compounds shown in the examples are readily prepared. The halogen is always on the first carbon of the 16-alkyl group in the compounds of our invention.

Among the compounds which may be prepared and which form part of our invention there may be mentioned 11β,17α,21-trihydroxy-16α- or β-fluoromethylΔ⁴-pregnene-3,20-dione; 11β,17α,21-trihydroxy-16α- or β-1'-fluoroethylΔ⁴-pregnene-3,20-dione; 11β,17α,21-hydroxy-16α- or β-1'-fluoropropylΔ⁴-pregnene-3,20-dione; 11β,17α,21-trihydroxy-16α- or β-1'-fluorobutylΔ⁴-pregnene-3,20-dione; 11β,17α,21-trihydroxy 16α or β-bromoethylΔ⁴-pregnene-3,20-dione; 11β,17α,21-trihydroxy-16α- or β-1'-bromoethylΔ⁴-pregnene - 3,20 - dione; 11β,17α,21-trihydroxy-16α- or β-chloromethylΔ⁴-pregnene-3,20-dione; 17α,21-dihydroxy-16α- or β-fluoromethylΔ⁴-pregnene-3,11,20-trione; 17α,21-dihydroxy-16α- or β-1'-fluoroethylΔ⁴-pregnene-3,11,20-trione; 17α,21-dihydroxy-16α or β-bromomethylΔ⁴-pregnene-3,11,20-trione; 17α,21-dihydroxy-16α- or 16β-chloromethylΔ⁴-pregnene-3,11,20-trione; 9α-fluoro-11β,17α-21-trihydroxy-16α- or 16β fluoromethylΔ⁴-pregnene-3,20-diones; 9α-fluoro-11β,17α,21-trihydroxy-16α- or 16β-bromomethylΔ⁴-pregnene-3,20-dione; 9α-fluoro-11β,17α,21-trihydroxy-16α- or 16β-chloromethylΔ⁴-pregnene-3,20-dione; 9α-bromo-11β,17α,21-trihydroxy-16α- or 16β-fluoromethylΔ⁴-pregnene-3,20-dione; 9α-fluoro-17α,21-dihydroxy-16α- or 16β-fluoromethylΔ⁴-pregnene-3,11,20-trione; 9α-fluoro-17α,21-dihydroxy-16α- or 16β-bromomethylΔ⁴-pregnene-3,11,20-trione; 9α-fluoro-17α,21-dihydroxy-16α- or 16β - chloromethylΔ⁴ - pregnene - 3,11,20 - trione; 9α - bromo - 17α,21 - dihydroxy - 16α- or 16β-fluoromethylΔ⁴ - pregnene - 3,11,20 - trione; 11β,17α,21- trihydroxy - 16α- or 16β - fluoromethylΔ¹,⁴-pregnadiene-3,20-dione; 11β,17α,21-trihydroxy-16α- or 16β-bromomethylΔ¹,⁴-pregnadiene-3,20-dione; 11β,17α,21-trihydroxy-16α- or 16β-chloromethylΔ¹,⁴-pregnadiene-3,20-dione; 17α,21-dihydroxy-16α- or 16β-fluoromethylΔ¹,⁴-pregnadiene-3,11,20-trione; 17α,21-dihydroxy-16α- or 16β-bromoethyl Δ¹,⁴-pregnadiene-3,11,20-trione; 17α,21-dihydroxy-16α- or 16β-chloromethylΔ¹,⁴-pregnadiene-3,11,20-trione; 9α-fluoro-11β,17α,21-trihydroxy-16α- or 16β-fluoromethylΔ¹,⁴-pregnadiene-3,20-dione; 9α-fluoro-11β,17α,21-trihydroxy-16β- or 16α-chloromethylΔ¹,⁴-pregnadiene-3,20-dione; 9α-bromo-11β,17α,21-trihydroxy-16α or 16β-fluoromethyl-Δ¹,⁴-pregnadiene-3,20-dione; 9α-fluoro-17α,21-dihydroxy-16α- or 16β-fluoromethylΔ¹,⁴-pregnadiene-3,11,20-trione; 9α-fluoro-17α,21-dihydroxy-16α- or 16β-bromomethylΔ¹,⁴-pregnadiene-3,11,20-trione; 9α-fluoro-17α,21-dihydroxy-16α- or 16β-chloromethylΔ¹,⁴-pregnadiene-3,11,20-trione; 9α-bromo-17α,21-dihydroxy-16α- or 16β-fluoromethylΔ¹,⁴-pregnadiene-3,11,20-trione as well as the 21 formates, acetates, propionates, and butyrates of all these and similar compounds.

The 16-halogenoalkyl steroids, which possess extremely high anti-inflammatory activity, may be administered orally, parenterally or topically. Thus, the active ingredient can be administered alone or may be associated with a carrier. A smaller quantity of the active 16-halogenoalkyl steroid may be administered to the patient and have the same therapeutic effect as larger quantities of other steroids such as cortisone or hydrocortisone. Any of the carriers used in pharmaceutical practice may be employed where there is no incompatibility with the active materials. The composition may take the form of tablets, powders, capsules, elixirs, syrups or other dosage forms which are particularly useful for oral ingestion. Liquid diluents are employed in sterile condition for parenteral use, namely, by injection. Such a medium may be a sterile solvent for the active material. For topical administration any of the known dermatologic vehicles may be employed. Such vehicles for external application include water-soluble ointment bases, oils, petrolatum and jellies.

Our invention can be illustrated by the following examples:

EXAMPLE I

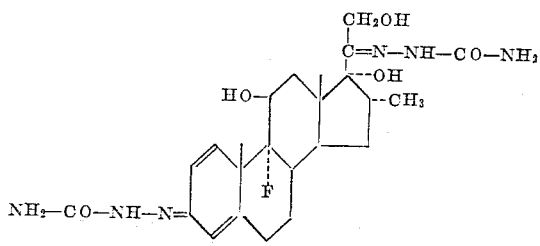

A mixture of 1.00 g. of 9α-fluoro-11β,17α,21-trihydroxy-16α-methyl-1,4-pregnadiene-3,20-dione, 750 mg. of semicarbazide base, 280 mg. of semicarbazide hydrochloride in 20 ml. of methanol and 10 ml. of dimethyl-formamide is refluxed for 20 hours under nitrogen. The mixture is cooled to 20° C. and 100 ml. of water is added with stirring. The precipitated 3,20-disemicarbazone of 9α-fluoro-11β,17α,21 - trihydroxy-16α-methyl-1,4-pregnadiene-3,20-dione is filtered, washed with water, and dried.

In a similar manner are prepared the 3,20-disemicarbazone of 9α-fluoro-11β,17α,21-trihydroxy-16β-methyl-1,4-pregnadiene-3,20-dione, 3,20-disemicarbazone of 11β,17α,21 - trihydroxy-16α-methyl-1,4-pregnadiene - 3,20-dione; 3,20-disemicarbazone of 11β,17α,21-trihydroxy-16β-methyl-1,4-pregnadiene-3,20-dione; 3,20-disemicarbazone of 17α,21-dihydroxy-16α-methyl-1,4-pregnadiene-3,11,20-trione and the 3,20-disemicarbazone of 17α,21-dihydroxy-16β-methyl-1,4-pregnadiene-3,11,20-trione.

EXAMPLE II

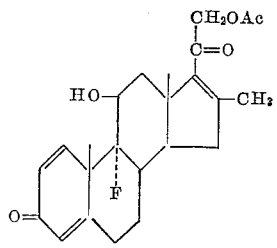

A solution of 500 mg. of the 3,20-disemicarbazone of 9α-fluoro - 11β,17α,21-trihydroxy - 16α-methyl-1,4-pregnadiene-3,20-dione in 10 ml. of acetic acid and 0.5 ml. acetic anhydride is refluxed under nitrogen for one hour to produce the corresponding 3,20-disemicarbazone of 11β,21-dihydroxy - 16-methyl - 1,4,16-pregnatriene-3,20-dione 21-acetate. The reaction mixture is cooled, 13 ml. of water is added and the mixture heated on the steam bath for 5 hours. It is then concentrated in vacuo nearly to dryness and water and chloroform added. The mixture is thoroughly extracted with chloroform, and the chloroform extract washed with excess aqueous potassium bicarbonate, saturated salt solution and dried over magnesium sulfate. Chromatography of the residue on neutral alumina and crystallization of pertinent benzene-chloroform fractions gives 9α-fluoro-11β,21-dihydroxy-16-methyl-1,4,16-pregnatriene-3,20-dione 21-acetate.

Similar treatment of the 3,20-disemicarbazone of 9α-fluoro - 11β,17α,21-trihydroxy - 16β-methyl - 1,4-pregnadiene-3,20-dione also leads to 9α-fluoro-11β,21-dihydroxy-16-methyl-1,4,16-pregnatriene - 3,20 - dione 21-acetate.

In a similar manner 11β,21-dihydroxy-16-methyl-1,4,16-pregnatriene-3,20-dione 21-acetate; and 21-hydroxy-16-methyl-1,4,16-pregnatriene-3,11,20-trione 21 - acetate; 9α-fluoro-11β,21-dihydroxy-16-methyl-4,16 - pregnadiene - 3,20-dione 21-acetate; 11β,21 - dihydroxy - 16-methyl-4,16-pregnadiene-3,20-dione 21-acetate and 21-hydroxy-16-methyl-4,16-pregnadiene-3,11,20-trione 21-acetate are obtained by starting with the appropriate 3,20-disemicarbazone in the above procedure.

EXAMPLE III

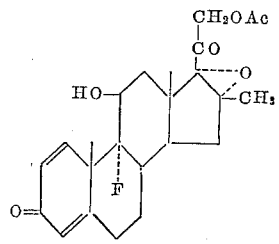

To a stirred solution of 500 mg. of 9α-fluoro-11β,21-dihydroxy-16-methyl-1,4,16-pregnatriene - 3,20-dione 21-acetate in 15 ml. of methylene chloride at 0° C. are added 8 g. of disodium hydrogen phosphate and 2 ml. of 2 M peroxytrifluoracetic acid in methylene chloride. After 10 minutes at 0° C. and 25° for one hour, water is added and the mixture thoroughly extracted with methylene chloride.

The latter extract is washed with saturated aqueous sodium chloride and dried over magnesium sulfate. Evaporation of the solvent and crystallization of the residue from acetone-ether gives 9α-fluoro-11β,21-dihydroxy-16β-methyl-16α,17α-oxido-1,4 - pregnadiene - 3,20-dione 21-acetate.

In a similar manner are prepared 11β,21-dihydroxy-16β-methyl-16α,17α-oxido-1,4-pregnadiene-3,20-dione 21-acetate; 21-hydroxy-16β-methyl - 16α,17α-oxido-1,4-pregnadiene-3,11,20-trione 21-acetate; 9α-fluoro-11β,21-dihydroxy-16β-methyl-16α,17α-oxido-4-pregnene - 3,20-dione 21-acetate; 11β,21 - dihydroxy-16β-methyl-16α-17α-oxido- 4-pregnene-3,20-dione 21-acetate, and 21-hydroxy-16β-methyl-16α,17α - oxido-4-pregnene - 3,11,20 - trione 21-acetate.

EXAMPLE IV

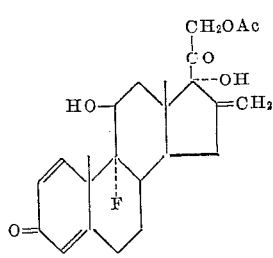

A solution of 600 mg. of 9α-fluoro-11β,21-dihydroxy-16β-methyl-16α,17α-oxido-1,4-pregnadiene-3,20-dione 21-acetate in 18 ml. of benzene and 2.5 ml. trifluoracetic acid is maintained at 25° C. for 18 hours. Ethyl acetate (50 ml.) is added, followed by sufficient 5% sodium carbonate to neutralize the acid present. The organic layer is washed with saturated aqueous sodium chloride, dried over magnesium sulfate and concentrated to dryness in vacuo. Crystallization of the residue from ethyl acetate leads to the desired 9α-fluoro-11β,17α,21-trihydroxy-16-methylene-1,4-pregnadiene-3,20-dione 21-acetate.

In a similar manner are prepared 11β,17α,21-trihydroxy-16-methylene-1,4-pregnadiene - 3,20-dione 21-acetate; 17α,21-dihydroxy-16-methylene-1,4 - pregnadiene-3,11,20-trione 21-acetate; 9α-fluoro-11β,17α,21-trihydroxy-16-methylene-4-pregnene-3,20-dione 21-acetate; 11β,17α,21-trihydroxy-16-methylene-4-pregnene-3,20-dione 21-acetate; and 17α,21-dihydroxy-16-methylene-4-pregnene-3,11,20-trione 21-acetate.

Alternatively, to a stirred solution of 600 mg. of 9α-fluoro-11β,21-dihydroxy-16β-methyl - 16α,17α-oxido-1,4-pregnadiene-3,20-dione 21-acetate in 2.4 ml. of tetrahydrofuran is added 3.5 ml. of a 2:1 by weight mixture of hydrogen fluoride in tetrahydrofuran. After 2 hours at 15° the reaction mixture is pipetted slowly into excess cold aqueous sodium carbonate solution. The mixture is extracted with chloroform and the chloroform extract washed with water and saturated aqueous sodium chloride. Chromatography of the residue on neutral alumina also leads to the desired 9α-fluoro-11β,17α,21-trihydroxy-16-methylene-1,4-pregnadiene-3,20-dione 21-acetate.

EXAMPLE V

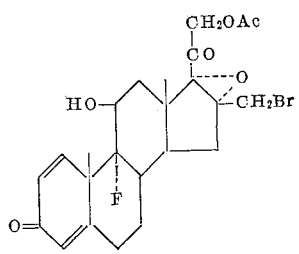

Three hundred mg. of the 9α-fluoro-11β,17α,21-trihydroxy-16-methylene-1,4-pregnadiene-3,20-dione 21-acetate prepared in Example 4 is mixed with 8 ml. of tertiary butyl alcohol. The mixture is stirred at 15° C., 1.5 cc. of water is then added followed by 265 mg. of N-bromosuccinimide. The reaction mixture is stirred at 25° C. for six hours. At the end of that time a few drops of 5% aqueous sodium sulfite is added to decolorize the reaction mixture and the solvent is removed under vacuum. About 10 cc. of water is then added and the crystalline residue is washed with water and dried to yield the 9α-fluoro - 11β,21 - dihydroxy - 16-bromomethyl - 16α,17α-oxido-1,4-pregnadiene-3,20-dione 21-acetate.

In a similar manner when the corresponding 16-alkylene steroid is substituted in the above preparation, there are obtained 11β,21-dihydroxy-16-bromomethyl-16α,17α-oxido-1,4-pregnadiene-3,20-dione 21-acetate; 21-hydroxy-16α,17α-oxido - 16 - bromomethyl - 1,4 - pregnadiene-3,11,20 - trione 21 - acetate; 9α - fluoro - 11β,21 - dihydroxy - 16α,17α - oxido - 16 - bromomethyl - 4 - pregnene-3,20-dione 21-acetate; 11β,21-dihydroxy-16α,17α-oxido-16-bromomethyl-4-pregnene-3,20-dione 21-acetate; and 21 - hydroxy - 16α,17α - oxido - 16 - bromomethyl - 4-pregnene-3,11,20-trione 21-acetate.

When N-chlorosuccinimide is substituted in equivalent quantities for N-bromosuccinimide in any of the above preparations, the corresponding 16-chloroalkyl compound is obtained.

EXAMPLE VI

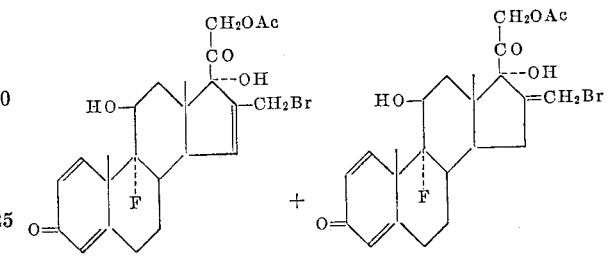

To a stirred solution of 800 mg. of the 16-haloalkyl-16α,17α-oxide (product of Example 5) in 10 ml. of glacial acetic acid at 15° C. is added 10 ml. of 7% hydrogen chloride in acetic acid at 15°. (Alternatively, similar results are obtained with 800 mg. of 16-halomethyl-16α,17α-oxide in 5 ml. of acetone and 1 ml. of concentrated hydrochloric acid cooled to 10–15°.) In either case after 20 minutes at 10–15° water is added and the solid product is filtered, washed with water and dried in air to give a mixture of the corresponding Δ15 16-halomethyl and 16-halomethylene steroids. This mixture is separated into its components by chromatography on Whatman #3 filter paper (40 mg. per 6″ x 20″ sheet) utilizing formamide as the stationary phase and chloroform benzene 1:9 as the mobile phase. The appropriate band (visible under ultraviolet light) is cut out, eluted with methanol, and the methanol concentrated to dryness in vacuum. Water is added to the residue, the solid filtered, washed with water and dried in air. Pure crystalline material is obtained in each case by crystallization from ethyl acetate-hexane or acetone-ether. Thus, when the 16-bromalkyl-16α,17α-oxide product of Example 5 is used, the product obtained is a mixture of 9α-fluoro-11β, 17α,21-trihydroxy, 16-bromomethyl-1,4,15-pregnatriene-3,20-dione 21-acetate, and 9α-fluoro-11,17α,21-trihydroxy-16-bromomethylene - 1,4 - pregnadiene - 3,20 - dione 21-acetate which is separated as described above.

In a similar manner, the corresponding Δ15 16-chloromethyl and 16-chloromethylene compounds are prepared by starting with the corresponding 16α,17α-oxides prepared in Example 5.

EXAMPLE VII

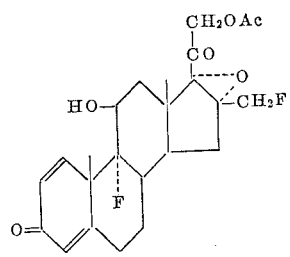

To the 16-bromalkyl-16α,17α-oxide (200 mg.) (product of Example 5) in 10 ml. of acetonitrile is added 500 mg. of silver fluoride. The reaction mixture is refluxed under nitrogen for 4 hours, cooled and concentrated to dryness in vacuo. Water is added and the mixture extracted with ethyl acetate. The organic extract is washed with 50% saturated sodium chloride solution, dried over magnesium sulfate and the solvent removed in vacuo. The residue is slurried in water and filtered to yield the corresponding 16-fluoromethyl-16,17-oxido steroid purified by crystallization from ethyl acetate-hexane. When any of the other 16-bromalkyl products of Example 5 are similarly treated in the above procedure, the corresponding 16-fluoromethyl compound is obtained.

EXAMPLE VIII

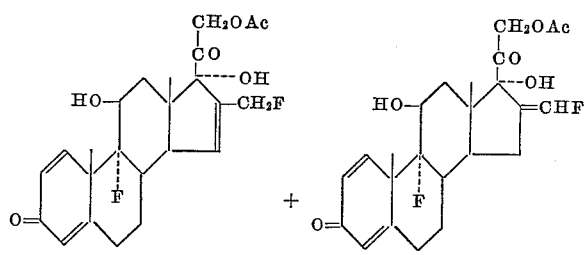

The product of Example 7 is used in the procedure of Example 6 in place of the starting material in that procedure to yield a mixture of 9α-fluoro-11β,17α,21-trihydroxy-16-fluoromethyl - 1,4,15 - pregnatriene-3,20-dione 21-acetate and 9α-fluoro-11β,17α,21-trihydroxy-16 - fluoromethylene-1,4-pregnadiene-3,20-dione-21-acetate. The components of the mixture are separated by paper chromatography as described in Example 6. Similarly any of the other 16-bromoalkyl products of Example 5, treated by the procedure of Example 7 and then by the procedure of Example 6, give the correspondingly substituted $\Delta^{15}$-16-fluoromethyl and 16-fluoromethylene steroids.

EXAMPLE IX

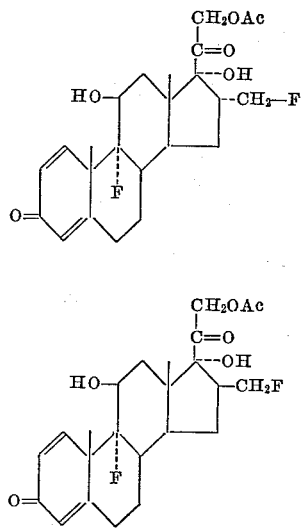

and

A solution of 500 mg. of the product of Example 8 in 30 ml. of methanol is stirred in hydrogen at 1 atmosphere and 25° over 400 mg. of 5% palladium on charcoal catalyst. Uptake of three equivalents of hydrogen is complete in two hours. One or both of the ring A double bonds reduce *before* the ring D 16-methylene or $\Delta^{15}$ double bonds. The reaction mixture is filtered and the filtrate concentrated to dryness in vacuo to give a solid residue consisting of 16α-fluoromethyl and 16β-fluoromethyl-9α-fluoro-11β,17α,21-trihydroxy-5α and 5β-pregnane-3,20-dione 21-acetates.

To 500 mg. of the mixture produced in the preceding paragraph in 30 ml. of t-amylalcohol and 0.1 ml. of acetic acid is added 500 mg. of selenium dioxide and 500 mg. of mercury. The mixture is stirred and refluxed under nitrogen for 18 hours. 500 mg. of selenium dioxide is then added and the mixture is refluxed an additional 24 hours. The mixture is filtered and the filtrate is evaporated to dryness. The residue is taken up in ethyl acetate and washed with dilute aqueous sodium hydroxide and water and dried over magnesium sulfate. It is then treated with activated charcoal, filtered, and the filtrate evaporated to dryness. The residue is separated into 16α-fluoromethyl-9α-fluoroprednisolone 21 - acetate and 16β-fluoromethyl-9α-fluoroprednisolone 21 - acetate by paper chromatography as described under Example 6.

The 21-acetates are hydrolyzed to the free 21-alcohols by treating 1.0 g. of compound with 30 ml. of methanol and 1 g. of KHCO₃ in 10 ml. of water, under nitrogen. The mixture is refluxed 7 minutes, cooled, and neutralized with 1 ml. of acetic acid in 10 ml. of water. The methanol is removed in vacuo and the product is extracted with ethyl acetate. Evaporation of the solvent gives the free 21-hydroxy compound.

When the other compounds produced in Example 8 or those in Example 6 are used in the above procedure in place of the above starting material, there is obtained the correspondingly substituted 16-halogenomethylΔ¹,⁴-steroid. Thus, by starting with the proper intermediate and using the procedures of Examples 1, 2, 3, 4, 5, 6 (and/or 7 and 8) and 9 there is obtained 11β,17α,21-trihydroxy-16α- and β-bromomethyl - 1,4 - pregnadiene-3,20-diones; 11β,17α,21-trihydroxy-16α and β-chloromethyl-1,4-pregnadiene-3,20-diones; 17α,21 - dihydroxy-16α and β-fluoromethyl-1,4-pregnadiene-3,11,20-triones; 17α,21-dihydroxy-16α and β-bromomethyl-1,4-pregnadiene-3,11,20 triones; 9α-fluoro-11β,17α,21-trihydroxy-16α and β-fluoromethyl-1,4-pregnadiene-3,20-diones; 9α-fluoro-11β,17α,21-trihydroxy-16β and α-chloromethyl-1,4-pregnadiene-3,20-diones; 9α-chloro - 11β,17α,21 - trihydroxy-16α and β-fluoromethyl-1,4-pregnadiene-3,20-diones; and 9α-fluoro-17α,21-dihydroxy-16α and β-fluoromethyl-1,4-pregnadiene-3,11,20-triones.

EXAMPLE X

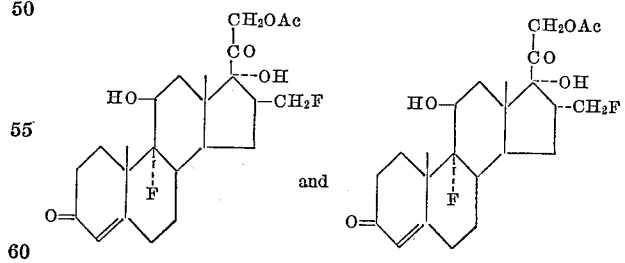

and

A solution of 200 mg. of 16α-fluoromethyl-9α-fluoroprednisolone-21-acetate in 20 ml. of ethylacetate is hydrogenated at 25° and 1 atmosphere over 100 mg. of 5% palladium on charcoal catalyst. Following uptake of one mole equivalent of hydrogen the reaction is stopped, the catalyst removed by filtration and the filtrate taken to dryness. The residue consists primarily of Δ⁴-3-ketone mixed with a minor amount of Δ¹-3-ketone. The pure Δ⁴-3-ketone (16α-methyl-9α,15α-difluorohydrocortisone 21-acetate) is obtained by crystallization of the residue from ethyl acetate-hexane.

In a similar manner starting with the corresponding 16β-fluoromethylprednisolone analog is obtained 16β-fluoromethyl-9α-fluorohydrocortisone 21-acetate.

EXAMPLE XI

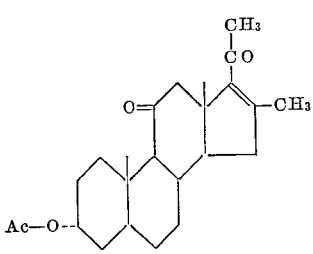

In a 500 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitroso-tosylamide in 50 ml. of ether is placed in the dropping funnel.

Diazomethane is generated by warming the generation flask to 40–45° C. and cautiously adding the N-methyl-N-nitro-tosylamide-ether from the dropping funnel. Nitrogen is utilized to sweep the diazomethane into a solution of 20 g. of 3α-acetoxy-16-pregnene-11,20-dione in 100 ml. of tetrahydrofuran and 120 ml. ether. The process is continued until the steroid solution remains yellow for several hours. The product, 3α-acetoxy-16α,17α-methyleneazo pregnane-11,20-dione largely precipitates from the reaction mixture. After 16 hours, the mixture is filtered, washed with ether and dried in air.

37.4 g. of 3α-acetoxy-16α,17α-methyleneazopregnane-11,20-dione is placed in a 500 ml. round-bottom flask and heated by an oil bath in vacuo (pressure 0.6 mm.). A manometer and 12-liter surge flask are in the line between the reaction flask and pump trap. When the bath temperature reaches 180° C. the 3α-acetoxy-16α,17α-methyleneazo-pregnane-11,20-dione begins to melt with evolution of nitrogen. The maximum pressure reached is 83 mm. After 10 minutes at 180–182° C. the melt is cooled. It is taken up in about 150 ml. of acetone, filtered through diatomaceous earth, concentrated to about 100 ml., and ether is slowly added to the boiling solution until crystallization occurs. The product is 3α-acetoxy-16-methyl-16-pregnene-11,20-dione.

Similarly, when 3α-acetoxy-16-allopregnene-11,20-dione is used in place of the acetoxy pregnene-dione, the corresponding acetoxy-16-methyl-16-allo-pregnene is obtained.

EXAMPLE XII

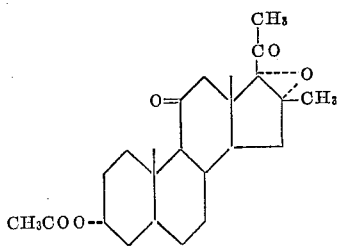

A solution of 20.0 g. of 3α-acetoxy-16-methyl-16-pregnene-11,20-dione dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15°–20° C. for 18 hours at which time the ultra-violet maximum at 249 has completed disappeared. Then 600 ml. of saturated salt water is slowly added, the crystalline precipitate is filtered, washed with water, and dried in air and in vacuum. The product is 16α,17α-epoxy-3α-hydroxy-16β-methyl - pregnane-11,20-dione which is acetylated at C-3 by treatment with 10 ml. of acetic anhydride and 20 ml. of pyridine at 25° for 18 hours. The product 16α,17α-epoxy-3α-acetoxy-16β-methyl-pregnane-11,20-dione is isolated by addition of water. It is filtered, washed with water and dried in air.

When the acetoxy-16-methyl-16-allopregnene is used instead of the pregnene above, the corresponding 16α,17α-oxide is obtained.

EXAMPLE XIII

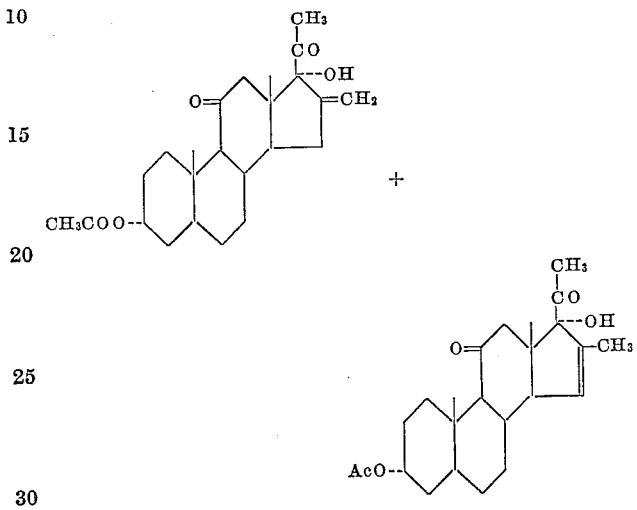

The procedure of Example 4 is followed, using an equivalent quantity of 16α,17α-epoxy-3α - acetoxy - 16β methyl pregnane 11,20 dione (prepared in Example 12) in place of fluorodihydroxymethyloxidopregnadiene starting material used there. The product is 3α acetoxy 17α hydroxy-16-methylene-pregna-11,20-dione.

When 16α,17α-epoxy-3α-acetoxy-16β-methyl - pregnane 11,20-dione is treated with hydrogen chloride in acetic acid by the procedure of Example 6 the product is a mixture of 3α-acetoxy-17α-hydroxy-16-methylene-pregna-11,20-dione and 3α-acetoxy-17α hydroxy-16-methyl 15-pregnene-11,20-dione, which need not be separated for the next step. When the 16α,17α oxido-16-allopregnane is used, the corresponding 16-methylene allopregnane is obtained.

EXAMPLE XIV

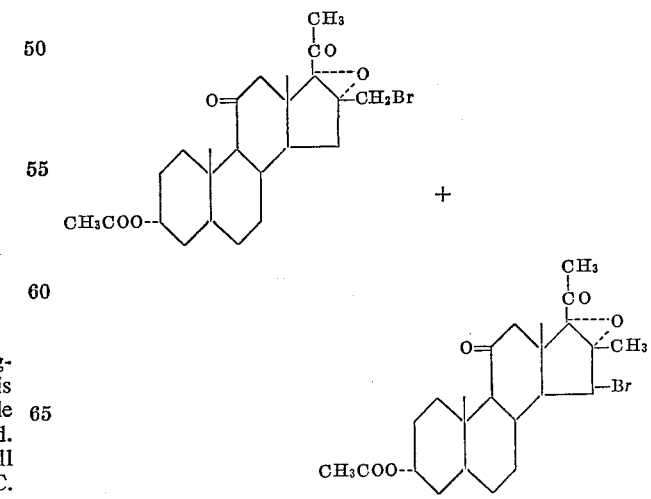

The procedure of Example 5 is followed, using an equivalent quantity of 3α acetoxy 17α hydroxy-16-methylene-pregna-11,20-dione in place of the 16 methylene pregnadienedione used there. The product is 3α-acetoxy-16-bromomethyl-16α,17α-oxido pregna-11,20-dione.

In a similar manner mixtures of 16-methylene pregnane and 16-methyl-15-pregnene prepared as described in Example 13 are treated with N-bromosuccinimide to give mixtures of 3α-acetoxy-16 bromomethyl-16α,17α - oxido pregna-11,20-dione and 3α-acetoxy-15β-bromo-16β-methyl 16α,17α-oxido pregna-11,20-dione which are separated by chromatography on neutral alumina. Similarly, when the 16-methylene allopregnane prepared in Example 13 is used instead, the corresponding 16-bromomethyl allopregnane is obtained.

When N-chlorosuccinimide is substituted for N-bromosuccinimide in equivalent quantities in the above preparation, the corresponding 16-chloromethyl compound is obtained.

EXAMPLE XV

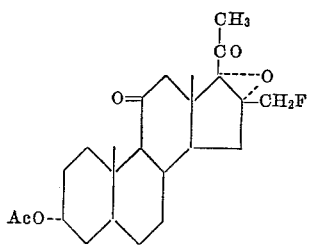

The procedure of Example 7 is followed using an equivalent quantity of 3α-acetoxy-16-bromomethyl - 16α,17α-oxido-pregna-11,20-dione (prepared in Example 14) in place of the product of Example 5 used as the starting material there. The product is 3α-acetoxy - 16 - fluoromethyl-16α,17α-oxido pregna-11,20-dione.

EXAMPLE XVI

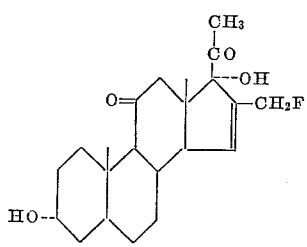

and

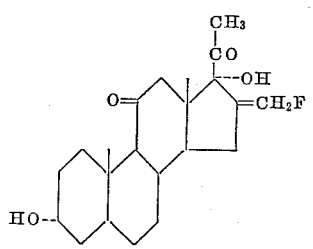

To a solution of 1.00 g. of 3α-acetoxy-16β-fluoromethyl-16α,17α-oxido-pregna-11,20-dione (prepared in Example 15) in 25 ml. of dioxane is added 10 ml. of 2 M aqueous perchloric acid. After 60 hours at 25–30°, water is added and the crystalline precipitate formed is filtered, washed with water and dried in air. The product is a mixture of 3α,17α-dihydroxy-16-fluoromethyl-15-pregnene-11,20-dione and 3α,17α-dihydroxy-16-fluoromethylene pregna-11,20-dione. Similarly when the 16-bromomethyl-16α,17α oxido and 16-chloromethyl-16α,17α oxido compounds prepared in Example 14 are treated similarly, the corresponding mixtures of bromomethyl pregnenedione and bromomethylene pregnadione or chloromethyl-pregnenedione and chloromethylene pregnadione are obtained. It is not necessary to separate these mixtures for use in the next step.

EXAMPLE XVII

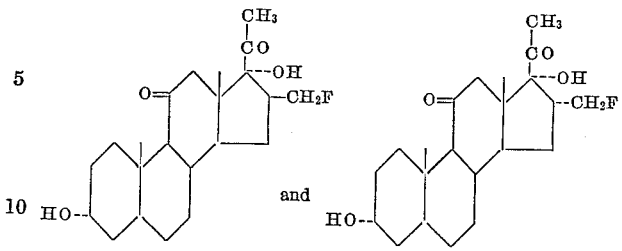

The hydrogenation procedure of Example 9 is followed using an equivalent quantity of the mixture of 3α,17α-dihydroxy-16-fluoromethyl-15-pregnene-11,20 dione and 3,17α-dihydroxy-16-fluoromethylene pregna-11,20 dione prepared in Example 16 in place of the product of Example 8. The product is a mixture of 3α,17α-dihydroxy-16α and β-fluoromethyl pregna-11,20-diones.

When the corresponding 16 bromomethyl-bromomethylene and 16-chloromethyl-chloromethylene mixtures are used in equivalent quantities in place of the fluoromethyl-fluoromethylene mixture used above, the corresponding mixtures of 16α and β bromomethyl or chloromethyl compounds are obtained. All these mixtures are separated, as in Example 9, by paper chromatography, into the α and β 16 halomethyl derivatives.

EXAMPLE XVIII

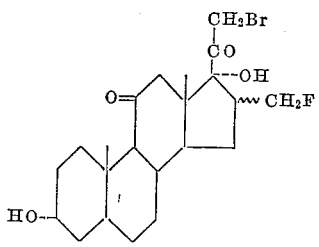

To a stirred solution of 1.60 g. of 16α-fluoromethyl-3α,17α-dihydroxy-pregnane-11,20-dione (the product of Example 17) in 32 ml. of chloroform, maintained at 30–35° C., is slowly added 840 mg. of bromine in 48 ml. of chloroform. Uptake of bromine is complete within 3 hours. Ether is added and the mixture washed twice with cold 5% potassium bicarbonate solution. The organic extract is dried over magnesium sulfate and the residue crystallized from acetone-ether to give 16α-fluoromethyl - 21-bromo-3α,17α-dihydroxy-pregnane-11,20- dione. The 16β-methyl epimer is prepared similarly.

When the corresponding 16 bromomethyl and chloromethyl products prepared by Example 17 are used in place of the above starting material, the corresponding 16-bromomethyl and 16 chloromethyl 21-bromo compounds are obtained.

EXAMPLE XIX

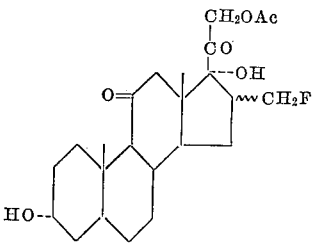

2.05 g. of 16α-fluoromethyl-21-bromo-3α,17α-dihydroxy-pregnane-11,20-dione (the product of Example 18), 1.58 g. of potassium iodide and 1.96 g. of anhydrous

23 potassium acetate in 40 ml. of acetone and 0.1 ml. of acetic acid are refluxed 17 hours. The mixture is concentrated to dryness in vacuo and partitioned between ethyl acetate and water. The ethyl acetate layer is washed with sodium chloride solution and dried over magnesium sulfate. Crystallization of the product from acetone-ether gives pure 16α-fluoromethyl-3α,17α,21-trihydroxy - pregnane-11,20-dione 21-acetate. The 16β-methyl epimer is prepared similarly.

When the 16-bromomethyl and 16-chloromethyl compounds prepared in Example 18 are used in place of the above starting material, the correspondingly substituted 21 acetates are obtained.

EXAMPLE XX

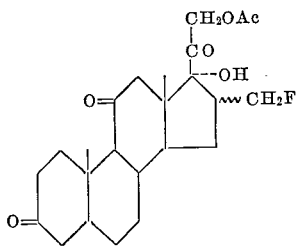

To a solution of 600 mg. of 16α-fluoromethyl-3α,17α,21-trihydroxy-pregnane-11,20-dione 21-acetate (the product of Example 19) in 16 ml. of acetic acid is added 284 mg. of sodium dichromate in 13 ml. of acetic acid. After 17 hours at 25° C., 50% saturated aqueous sodium chloride solution is slowly added. The precipitated product is filtered, washed with water, dried in air and recrystallized from acetone-ether to give 16α-fluoromethyl-17α,21 - dihydroxy - pregnane-3,11,20-trione 21-acetate. The 16β-methyl epimer is prepared similarly.

When the 16 bromomethyl and 16 chloromethyl products of Example 19 are used in place of the above starting material, the correspondingly substituted 16 bromomethyl and chloromethyl-3-keto compounds are obtained.

EXAMPLE XXI

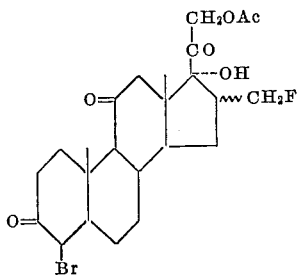

To a stirred solution of 630 mg. of 16α-fluoromethyl-17α-21-dihydroxy-pregnane-3,11,20-trione 21-acetate (the product of Example 20) in 10 ml. of acetic acid and 8 ml. of chloroform kept at —10° C. is added 240 mg. of bromine in 6 ml. of chloroform. After addition is complete, 1.2 g. of sodium acetate in 7 ml. of cold water is added. Additional water is added and the mixture is extracted with chloroform. The chloroform extract is washed with dilute potassium bicarbonate, water, and dried over sodium sulfate. The residue is triturated with ether to give crystalline 4-bromo-16α-fluoromethyl-17α, 21-dihydroxy-pregnane-3,11,20-trione 21 - acetate. The 16β-methyl epimer is prepared similarly.

When the other products of Example 20 are used in place of the above starting material, the correspondingly substituted 4-bromo compounds are obtained.

24

EXAMPLE XXII

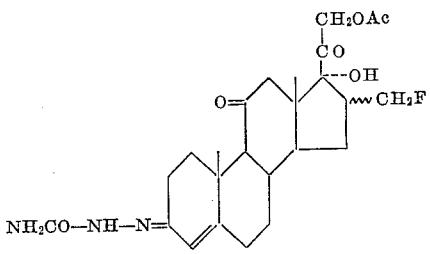

To 580 mg. of 4-bromo-16α-fluoromethyl-17α,21-dihydroxy-pregnane-3,11,20-trione 21-acetate (the product of Example 21) in 20 ml. of acetonitrile under nitrogen is added a slurry of 300 mg. of semicarbazide hydrochloride and 200 mg. sodium bicarbonate in 4 ml. of water. After 2 hours, the acetonitrile is removed in vacuo, water added and the crystalline 3-semicarbazone of 16α-fluoromethyl-17α,21-dihydroxy-4-pregnene-3,11,20-trione 21-acetate is filtered, washed with water, and dried in air. The 16β-methyl epimer is prepared similarly.

When any of the other compounds produced in Example 21 are used in equivalent quantity in place of the above starting material, the correspondingly substituted Δ⁴-pregnene 3-semicarbazone is formed.

EXAMPLE XXIII

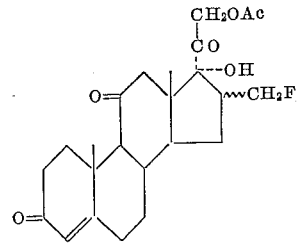

500 mg. of the semicarbazone of 16α-fluoromethyl-17α,21-dihydroxy-4-pregnene-3,11,20-trione 21 - acetate (the product of Example 22) is dissolved in 20 ml. of acetic acid, 1.5 ml. of pyruvic acid and 5 ml. of water. After 18 hours at 25° C., water is added and the mixture is extracted with chloroform. The chloroform extract is washed with aqueous bicarbonate, water, and dried over sodium sulfate. Removal of the solvent gives 16α-fluoromethyl-17α,21-dihydroxy-4-pregnene-3,11,20 - trione 21-acetate which is purified by recrystallization from acetone and ether. The 16β-methyl epimer is prepared similarly. The corresponding 21-alcohols are prepared by treatment with aqueous methanolic potassium bicarbonate as described under Example 9. In a similar manner are obtained the 16α and 16β-bromo and chloroalkyl cortisone derivatives.

EXAMPLE XXIV

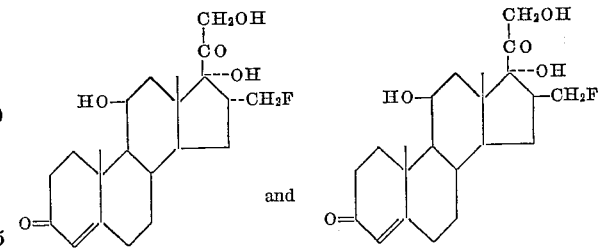

The 11 carbonyl group of the products of Example 23 is converted to an 11β-hydroxyl group by the procedures of N. L. Wendler, Huang-Minlon and M. Tishler, J. Am. Chem. Soc., 73, 3818 (1951), and R. E. Jones and S. A. Robinson, J. Org. Chem., 21, 586 (1956), in which the 3 and 20-carbonyl groups are protected as the 3,20-bis-semicarbazone, the 11-keto group is reduced by sodium borohydride or lithium borohydride and the semicarbazone protecting groups are removed by treatment with aqueous acetic acid pyruvic acid. Among the products of this sequence of reactions are 16α-fluoromethylhydrocortisone, 16β-fluoromethylhydrocortisone and the 16α or 16β-bromo and chloro alkyl hydrocortisone analogs. The corresponding 21-acetates are prepared by treatment of the 21-alcohols with acetic anhydride and pyridine at 25° for 17 hours.

EXAMPLE XXV

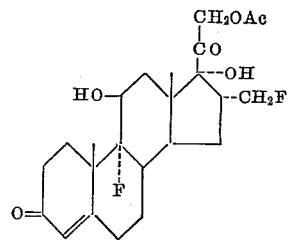

and

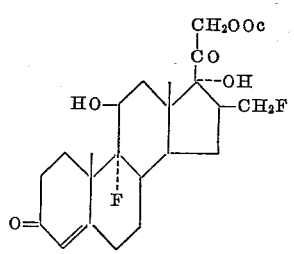

Halogen at position 9 is introduced into the products of Example 24 by the procedures of J. Fried and E. F. Sabo, J. Am. Chem. Soc., 75, 2273 (1953), and R. F. Hirschmann, R. Miller, J. Wood and R. E. Jones, ibid., 78, 4956 (1956), involving formation of the 9,11-olefin, the 11β-hydroxyl-9α-bromo compound, the 9β,11β-oxide and the 11β-hydroxyl-9α-fluoro or 9α-chloro compounds. Among the products of this sequence are 16α-fluoromethyl 9α-fluorohydrocortisone 21-acetate, 16β-fluoromethyl 9α-fluoro hydrocortisone 21 acetate and other 16α and 16β-bromo and chloroalkyl 9α-halo hydrocortisone analogs. The 21-alcohols are prepared by treatment with aqueous methanolic potassium bicarbonate as described in Example 9. The corresponding 11-ketones are prepared by treatment with sodium dichromate in acetic acid as described under Example 20.

We claim:
1. Compounds of the formula

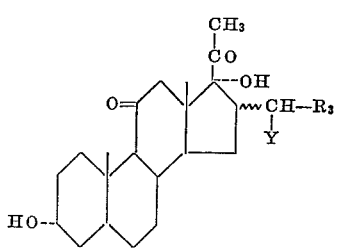

in which $R_3$ is selected from the group consisting of hydrogen and alkyl and Y is halogen, the wavy line indicating a selection from the group consisting of alpha and beta substituents.

2. The compound of the formula

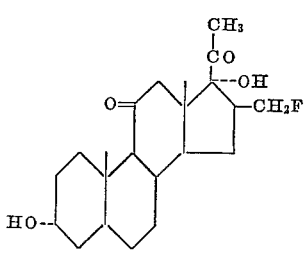

3. The compound of the formula

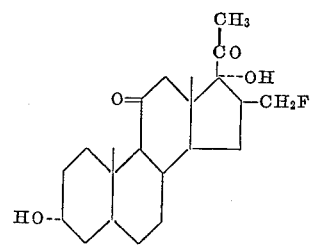

4. A process of preparing a compound of the formula

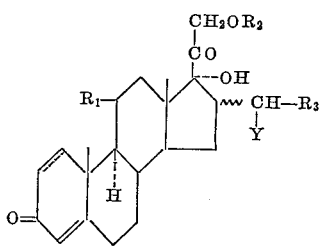

in which $R_1$ is selected from the group consisting of keto and β hydroxyl, $R_2$ is selected from the group consisting of hydrogen and lower alkanoyl, $R_3$ is selected from the group consisting of hydrogen and lower alkyl, X is selected from the group consisting of hydrogen, chloro and fluoro, Y is halogen, the dotted line in ring A indicates that the bond joining carbons No. 1 and No. 2 is selected from the group consisting of a single bond and a double bond, and the wavy line joining the 16 substituent to the ring indicates the selection from the group consisting of alpha and beta substituents, which comprises agitating a solution of the corresponding 16-lower alkylidenyl-17α-hydroxy steroid in an aqueous alcoholic solvent with an N-halosuccinimide, in which the halogen is selected from the group consisting of bromine and chlorine, isolating the resultant 16-haloalkyl-16α,17α-epoxy steroid, if desired converting said halogen to a fluorine by refluxing it in acetonitrile solution with silver fluoride and isolating the 16-fluoroalkyl 16α,17α-epoxy steroid, converting the said 16-halogenoalkyl-16α,17α-steroid to a mixture of the corresponding 16-haloalkylidenyl-17α-hydroxy steroid and Δ¹⁵ 16-haloalkyl 17α-hydroxy steroid by stirring in a solution of strong acid in an organic solvent, isolating said mixture, reducing said mixture by agitating it in an inert solvent under an atmosphere of hydrogen over a hydrogenation catalyst and recovering from the reduction a mixture of the corresponding 16α and 16β halogenoalkyl steroids having saturated ring A, reintroducing the unsaturation in ring A by agitating with selenium dioxide and mercury to obtain a mixture of the corresponding 16α and 16β halogeno alkyl Δ¹,⁴ pregnadienes, if desired, partially reducing the said mixture by catalytic hydrogenation to an uptake of one mole of hydrogen to obtain the Δ⁴ pregnene, if desired, separating the mixture into the individual 16α and 16β derivatives, and, if desired, obtaining the free 21 hydroxyl by refluxing the product with alcoholic bicarbonate.

5. A process of preparing a compound of the formula

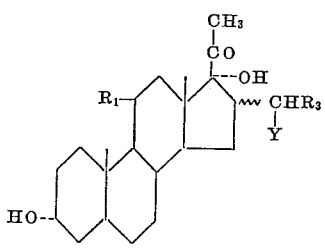

in which Y is halogen, $R_1$ is selected from the group consisting of keto and β hydroxy and $R_3$ is selected from the group consisting of hydrogen and lower alkyl which comprises, starting with a 3-β-hydroxy-16-lower alkyl-16α,17α epoxy-pregnane-11,20-dione, agitating said pregnane dione with strong acid to form the corresponding 16-alkylidene-17α hydroxy steroid, agitating said 16 alkylidene steroid in aqueous alcoholic solution with an N-halosuccinimide, in which the halogen is selected from the group consisting of bromine and chlorine, isolating the resulting 16-haloalkyl-16α,17α-epoxy steroid, if desired converting the said halogen to a fluorine by refluxing it in acetonitrile solution with silver fluoride and isolating the said 16 fluoroalkyl 16α,17α epoxy steroid, converting the 16-halogenoalkyl 16α,17α epoxy steroid to a mixture of the corresponding 16 haloalkylidenyl 17α-hydroxy steroid and $\Delta^{15}$ 16 haloalkyl 17α hydroxy steroid by stirring in a solution of HCl in an organic solvent, isolating said mixture, reducing said mixture by agitating it in an inert solvent under an atmosphere of hydrogen over a hydrogenation catalyst and recovering from the reduction a mixture of the corresponding 16α and 16β halogenoalkyl steroids, and, if desired, separating the 16α and 16β constituents of the mixture by paper chromatography.

6. A process of preparing a compound of the formula

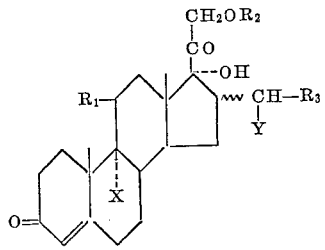

in which $R_1$ is selected from the group consisting of keto and β hydroxyl, $R_2$ is selected from the group consisting of hydrogen and lower alkanoyl, $R_3$ is selected from the group consisting of hydrogen and lower alkyl, X is selected from the group consisting of hydrogen, chloro and fluoro, Y is halogen, the dotted line in ring A indicates that the bond joining carbons 1 and 2 is selected from the group consisting of single and double bonds, and the wavy line joining the 16 substituent to the ring indicates selection from the group consisting of alpha and beta substituents, which comprises starting with a compound of the formula

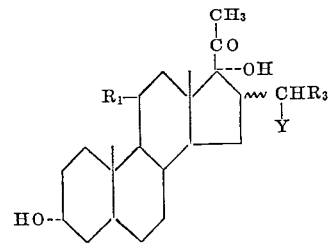

in which Y is halogen, $R_1$ is selected from the group consisting of keto and β hydroxy and $R_3$ is selected from the group consisting of hydrogen and lower alkyl, introducing a hydroxyl at C21 by bromination followed by reaction with potassium acetate, oxidizing the hydroxyl at C3 and introducing unsaturation into ring A, and a chloro or fluoro at C9, by standard methods.

No references cited.

LEWIS GOTTS, *Primary Examiner.*

L. H. GASTON, ELBERT L. ROBERTS, *Examiners.*

R. E. WEXLER, *Assistant Examiner.*